US012315022B2

(12) United States Patent
Scheidler et al.

(10) Patent No.: US 12,315,022 B2
(45) Date of Patent: *May 27, 2025

(54) REAL-TIME VALIDATION OF DISTRIBUTED ENERGY RESOURCE DEVICE COMMITMENTS (71) Applicant: ITRON, INC., Liberty Lake, WA (US)

(72) Inventors: Lucas Scheidler, Oakland, CA (US); Tim Patterson, Middle River, MD (US)

(73) Assignee: ITRON, INC., Liberty Lake, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/078,866

(22) Filed: Dec. 9, 2022

(65) Prior Publication Data
US 2023/0115009 A1 Apr. 13, 2023

Related U.S. Application Data (63) Continuation of application No. 16/352,761, filed on Mar. 13, 2019, now Pat. No. 11,532,055.
(Continued)

(51) Int. Cl.
G06Q 50/06 (2024.01)
G06N 20/00 (2019.01)
(Continued)

(52) U.S. Cl.
CPC ............ G06Q 50/06 (2013.01); G06N 20/00 (2019.01); G06Q 10/06393 (2013.01); G06Q 10/067 (2013.01); G06Q 20/389 (2013.01)

(58) Field of Classification Search
CPC . G06Q 50/06; G06Q 10/06393; G06Q 10/067
See application file for complete search history.

(56) References Cited

U.S. PATENT DOCUMENTS 8,560,134 B1 10/2013 Lee
2004/0117236 A1 6/2004 Subramanian et al.
(Continued)

FOREIGN PATENT DOCUMENTS

WO 2009/048963 A1 4/2009

OTHER PUBLICATIONS

Ma et al., Distributed Energy Management for Networked Microgrids Using Online ADMM With Regret IEEE Transactions on Smart Grid, vol. 9, No. 2, pp. 847-856, Mar. 2018 (Year: 2018).*
(Continued)

Primary Examiner — Nadja N Chong Cruz
(74) Attorney, Agent, or Firm — Artegis Law Group, LLP (57) ABSTRACT A computing device receives a commitment generated by a distributed resource device, the commitment indicating a type of the distributed resource device and a time interval when the distributed resource device modified usage of a resource at a location; receives an event corresponding to a pattern of usage of the resource at the location during the time interval; identifies an event model that is associated with a pattern of usage of the resource that matches the pattern of usage of the resource at the location during the time interval, the event model being included in a library of event models that associate different patterns of usage of the resource with corresponding types of distributed resource devices; and validates the commitment in response to determining that at least a type of distributed resource device associated with the event model corresponds to the type of distributed resource device indicated by the commitment.

20 Claims, 6 Drawing Sheets

Related U.S. Application Data (60) Provisional application No. 62/799,673, filed on Jan. 31, 2019.

(51) Int. Cl.
  *G06Q 10/0639* (2023.01)
  *G06Q 10/067* (2023.01)
  *G06Q 20/38* (2012.01)

(56) References Cited

U.S. PATENT DOCUMENTS

| | | |
|---|---|---|
| 2005/0055137 A1 | 3/2005 | Andren et al. |
| 2010/0106342 A1 | 4/2010 | Ko et al. |
| 2012/0290230 A1 | 11/2012 | Berges Gonzalez et al. |
| 2012/0296490 A1 | 11/2012 | Fausak et al. |
| 2016/0198245 A1 | 7/2016 | Rhoads et al. |
| 2016/0356830 A1 | 12/2016 | Choe et al. |
| 2017/0083989 A1 | 3/2017 | Brockman et al. |
| 2017/0160711 A1 | 6/2017 | Wong et al. |
| 2017/0206522 A1 | 7/2017 | Schiatti et al. |
| 2017/0206614 A1 | 7/2017 | Hwang et al. |
| 2017/0358041 A1 | 12/2017 | Forbes, Jr. et al. |
| 2018/0130130 A1 | 5/2018 | Dechu et al. |
| 2018/0165660 A1 | 6/2018 | High et al. |
| 2018/0183587 A1 | 6/2018 | Won et al. |
| 2018/0232819 A1 | 8/2018 | Stocker et al. |
| 2018/0373304 A1 | 12/2018 | Davis et al. |
| 2019/0164236 A1 | 5/2019 | Mayne et al. |
| 2019/0172159 A1 | 6/2019 | Sun et al. |
| 2019/0288513 A1 | 9/2019 | Nakayama et al. |
| 2019/0393722 A1 | 12/2019 | Stocker et al. |

OTHER PUBLICATIONS

Theo et al., Review of distributed generation (DG) system planning and optimisation techniques: Comparison of numerical and mathematical modelling methods, Renewable and Sustainable Energy Reviews, vol. 67, 2017, pp. 531-573 (Year: 2017).*

Silvestre et al., "A Technical Approach to the Energy Blockchain in Microgrids", vol. 14, No. 11, Nov. 2018, pp. 4792-4803.

Liserre et al., "The Smart Transformer", Impact on the electric grid and technology challenges, Jun. 22, 2016, pp. 46-58.

Zeynal et al., "Intelligent Substation Automation Systems for Robust Operation of Smart Grids", IEEE, 2014, pp. 786-790.

Noor et al., "Energy Demand Side Management Within Micro-Grid Networks Enhanced by Blockchain", Applied Energy, vol. 228, Jul. 11, 2018, pp. 1385-1398.

Teco e-motion, "Standard Motor Catalog", 2017, 28 pages.

Wikipedia, "Power Factor", https://en.wikipedia.org/wiki/Power_factor, Dec. 12, 2020, 16 pages.

Mashima et al., "Evaluating Electricity Theft Detectors in Smart Grid Networks", 2012, 21 pages.

Colson, CM., "An Alternative Method to Load Modeling for Obtaining End-Use Load Profiles", IEEE, 2009, 5 pages.

Dinesh et al., "Non-Intrusive Load Monitoring Under Residential Solar Power Influx", Applied Energy, DOI: 10.1016/j.apenergy.2017.08.094, vol. 205, Mar. 16, 2017, 25 pages.

* cited by examiner

REAL-TIME VALIDATION OF DISTRIBUTED ENERGY RESOURCE DEVICE COMMITMENTS

CROSS-REFERENCE TO RELATED APPLICATIONS

This application is a continuation of United States patent application titled, ""Real-Time Validation of Distributed Energy Resource Device Commitments," filed on Mar. 13, 2019 and having Ser. No. 16/352,761 and claims the priority benefit of United States provisional patent application titled, "Real-Time Validation of Distributed Energy Resource Device Commitments," filed on Jan. 31, 2019 and having Ser. No. 62/799,673. The subject matter of these related applications are hereby incorporated herein by reference.

BACKGROUND

Field of the Various Embodiments

Embodiments of the present invention relate generally to utility networks and utility distribution infrastructures and, more specifically, to real-time validation of distributed energy resource device commitments.

Description of the Related Art

In conventional utility networks and utility distribution infrastructures, one or more utility providers generate resources that are distributed to one or more downstream resource consumers. For example, a nuclear power plant could generate electricity that is then distributed to various electricity consumers within a city. A given downstream resource consumer usually has a utility meter that monitors various characteristics associated with the distribution and/or consumption of resources. For example, a residence could have an electricity meter that monitors the rate at which the residence consumes electricity, the total amount of electricity distributed to the residence over a particular period of time, and so forth.

In more modern utility networks and utility distribution infrastructures, the downstream resource consumers sometimes have distributed energy resource (DER) devices that are configured to help distribute, generate, and/or store resources. One example of a DER device is a smart thermostat that, under specific circumstances, limits the amount of electricity being consumed by a consumer. Another example of a DER device is a solar power system that generates solar-based electricity for consumption by one or more consumers and/or for distribution onto a utility distribution infrastructure. Yet another example of a DER device is a home battery system that stores electricity that can be subsequently consumed during periods of peak electricity demand. As a general matter, DER devices are deployed to reduce costs and to improve the efficiency with which resources can be distributed to consumers.

In certain situations, a consumer can configure a given DER device to participate in one or more energy markets in order to earn financial incentives. For example, a consumer could configure a smart thermostat to participate in a demand-response program offered by a utility provider in exchange for a rebate or other form of compensation. As part of such a program, the consumer could configure the smart thermostat to turn off climate control at the residence of the consumer whenever the utility provider instructs the smart thermostat to do so, and the consumer would be compensated for participating in the program. Among other things, these types of arrangements enable utility providers to limit how much electricity is consumed during periods of peak electricity demand.

When a DER device participates in an energy market, the DER device is usually configured to operate in accordance with the terms of a contract. For example, a smart thermostat could be configured to operate in accordance with a contract that specifies the particular circumstances under which a utility provider can cause the smart thermostat to turn off or turn off climate control. The owners of such contracts can be utility providers, but, more typically, the contract owners are third-party vendors that manage the participation of DER devices in various energy markets on behalf of the utility providers.

Contracts that manage the participation of DER devices in energy markets can specify a wide variety of different operations that participating DER devices need to perform. One requirement found in some contracts is that a participating DER device should generate "commitments" that indicate the specific actions the DER device implemented to fulfill various terms of the relevant contract. For example, a smart thermostat could generate a commitment indicating that the smart thermostat turned off climate control at the residence of a given consumer when instructed to do so by the relevant utility provider. Upon receiving a commitment, the contract owner analyzes the commitment to confirm that the terms of the contract have been met and thereby validate the commitment. The contract owner then compensates the consumer for participation in the energy market. The process of validating commitments and compensating consumers is referred to as the "settlement" process.

One drawback of the above approach is that the settlement process can take three months or more to complete. Consequently, consumers have to wait for extended periods of time to receive compensation when participating in energy market programs. These lengthy wait times can dissuade consumers from participating in energy market programs. If fewer consumers participate in energy market programs, then utility providers may have greater difficulty providing resources to consumers efficiently and at reduced cost.

As the foregoing illustrates, what is needed in the art are more effective ways to validate DER device commitments.

SUMMARY

Some embodiments include a computer-implemented method for validating distributed resource device commitments, including determining that a first commitment received from a first distributed resource device indicates that the first distributed resource device modified how much of a resource was consumed at a first location during a first time interval, generating first metrology data that indicates how much of the resource was consumed at the first location during the first time interval, and validating the first commitment based on the first metrology data associated with the first location.

One technological advantage of the disclosed approach relative to the prior art is that commitments reported by distributed resource devices are validated automatically by the utility meter, which enables the settlement process to be performed much faster relative to conventional approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, DER devices can be configured to participate in energy markets in order to earn financial incentives for a consumer. To participate in a given energy market, the consumer or a third party configures the given DER device to operate in accordance with a contract that at least partially defines the operation of the DER device. When the DER device performs various operations in accordance with the contract, the DER device also generates a "commitment" indicating the specific actions the DER device performs to fulfil the terms of the contract. A contract holder, such as a utility provider or a third-party intermediary, then validates the commitment and compensates the consumer via a process that is referred to as "settlement."

One drawback associated with a conventional settlement process is that validating commitments generally takes a long time, sometimes in excess of three months. For example, suppose a given DER device participates in an energy market and reports commitments to a contract holder to initiate the settlement process. To validate a given commitment, an analyst associated with the contract holder would first have to analyze the commitment to identify the particular operations performed by the DER device. The analyst would then have to analyze a contract associated with the energy market to determine whether those operations meet the terms of the contract. The analyst would also have to access utility meter data associated with the location where the DER device resides in order to verify that the DER device did, indeed, perform the reported operations. Specifically, the analyst would have to analyze the meter data during a time interval where the reported operations are supposed to have occurred, and then determine whether the meter data supports the occurrence of these operations. Depending on the availability of data, these analyses are carried out at varying levels of aggregation and accuracy.

The steps described above are manually performed by the analyst and can therefore take a long time. Further, contract holders are oftentimes backlogged with commitments and therefore cannot begin the settlement process immediately. These various delays ultimately cause the consumer to have to wait to be compensated for participating in the energy market. Consumers usually do not appreciate having to wait for compensation. As such, when the settlement process takes a long time, consumers may find participating in energy markets less desirable. Energy markets help improve the efficiency with which resources can be distributed. When fewer consumers participate in energy markets, utility providers can have difficulty providing consumers with resources efficiently and/or at low cost.

To address these issues, embodiments of the invention include a smart utility meter that validates commitments generated by DER devices coupled behind the smart utility meter. The DER devices reside in a location where the utility meter monitors the distribution of resources. The DER devices can modify the distribution, generation, and/or storage of resources at the location in accordance with, at least to some degree, a contract associated with an energy market. When a given DER device operates in accordance with a given contract, the DER device reports a commitment to the smart utility meter indicating the specific operations the DER device performs to fulfill the terms of the contract.

The utility meter analyzes the commitment to determine a time interval when the reported operations were to occur. The utility meter then analyzes meter data associated with the distribution of resources at the location to identify any events associated with the time interval. Upon identifying an event, the utility meter can map the event to the DER device based on a library of events corresponding to different DER devices. The utility meter can also map the event to the reported operation. If the utility meter successfully maps the event to both the DER device and the reported operations, then the occurrence of the operations is confirmed and the DER device generates a validated commitment. The validated commitment can be transmitted to relevant parties in order to expedite the settlement process.

One technological advantage of the disclosed approach relative to the prior art is that commitments reported by DER devices are validated automatically by the utility meter, which enables the settlement process to be performed much faster relative to conventional approaches. Accordingly, consumers can be compensated for participating in energy markets much faster than the three-month or longer periods typically associated with conventional settlement processes. This technological advantage represents at least one technological advancement relative to prior art approaches.

System Overview

Figure 1:
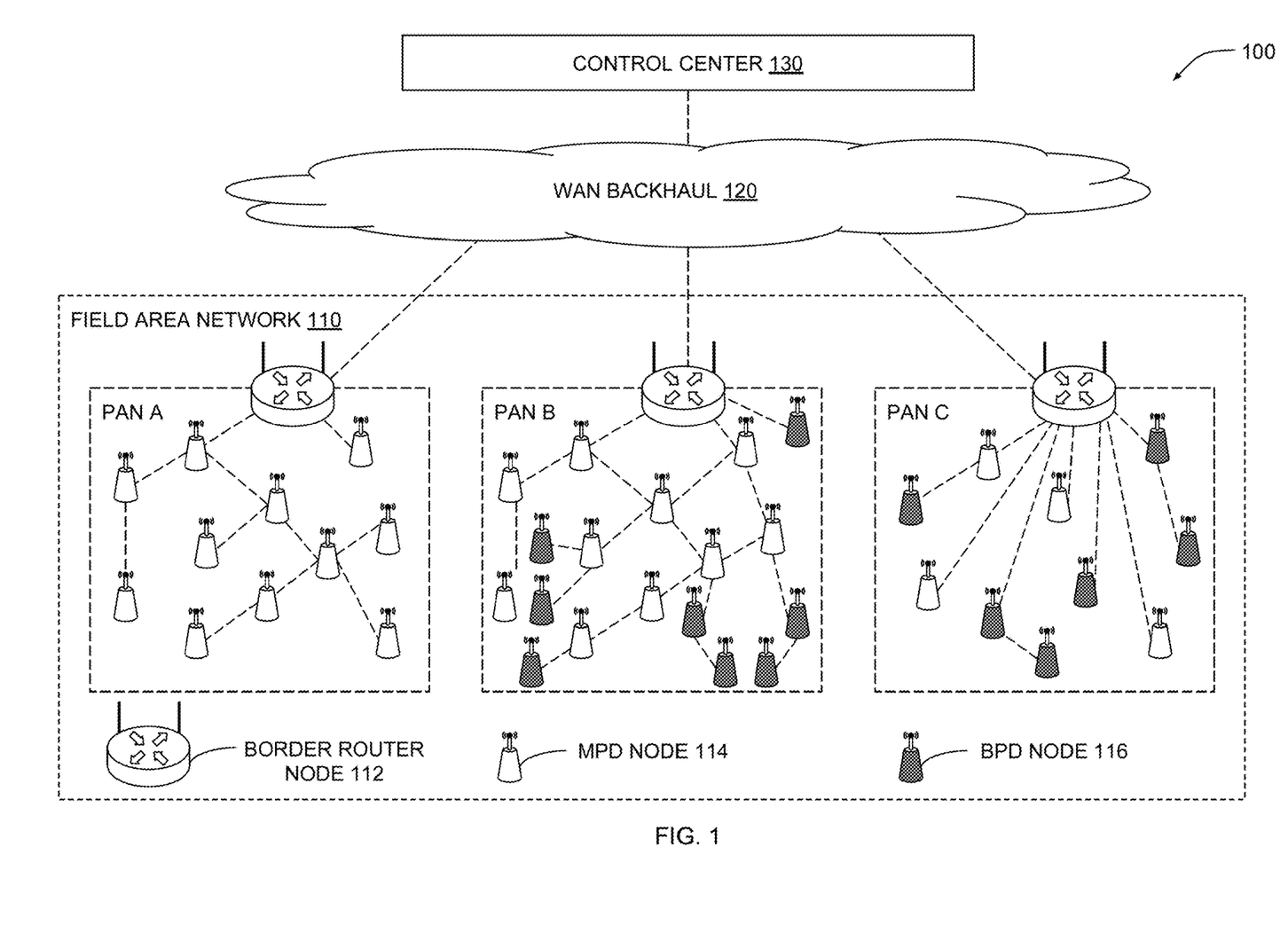
FIG. 1 illustrates a network system configured to implement one or more aspects of the present embodiments.

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels, the media access control (MAC) address of the node, and other information associated with the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware.

Any of the nodes discussed above can be configured as a smart utility meter and be coupled to a utility line in order to monitor the distribution of resources at a particular location via the utility line. For example, an MPD node 114 could be configured as a smart electric meter and be coupled to a power line in order to monitor the distribution of electricity at a residence via the power line. A given node that is configured as a smart utility meter generates real-time metrology data quantifying the distribution of resources at the location where the given node resides. The given node then periodically reports this metrology data to control center 130 via FAN 110.

A given node that is configured as a smart utility meter can be coupled to, and configured to interoperate with, one or more DER devices in a "behind-the-meter" configuration. As referred to herein, a behind-the-meter or BTM configuration generally includes a node that is coupled to a utility line and one or more DER devices that are coupled to the utility line downstream of the node. The node monitors the distribution of resources via the utility line. The DER devices modify the distribution of resources via the utility line in a detectable manner. An exemplary behind-the-meter configuration is described in greater detail below in conjunction with FIG. 2.

Exemplary Behind-the-Meter Configuration

Figure 2:
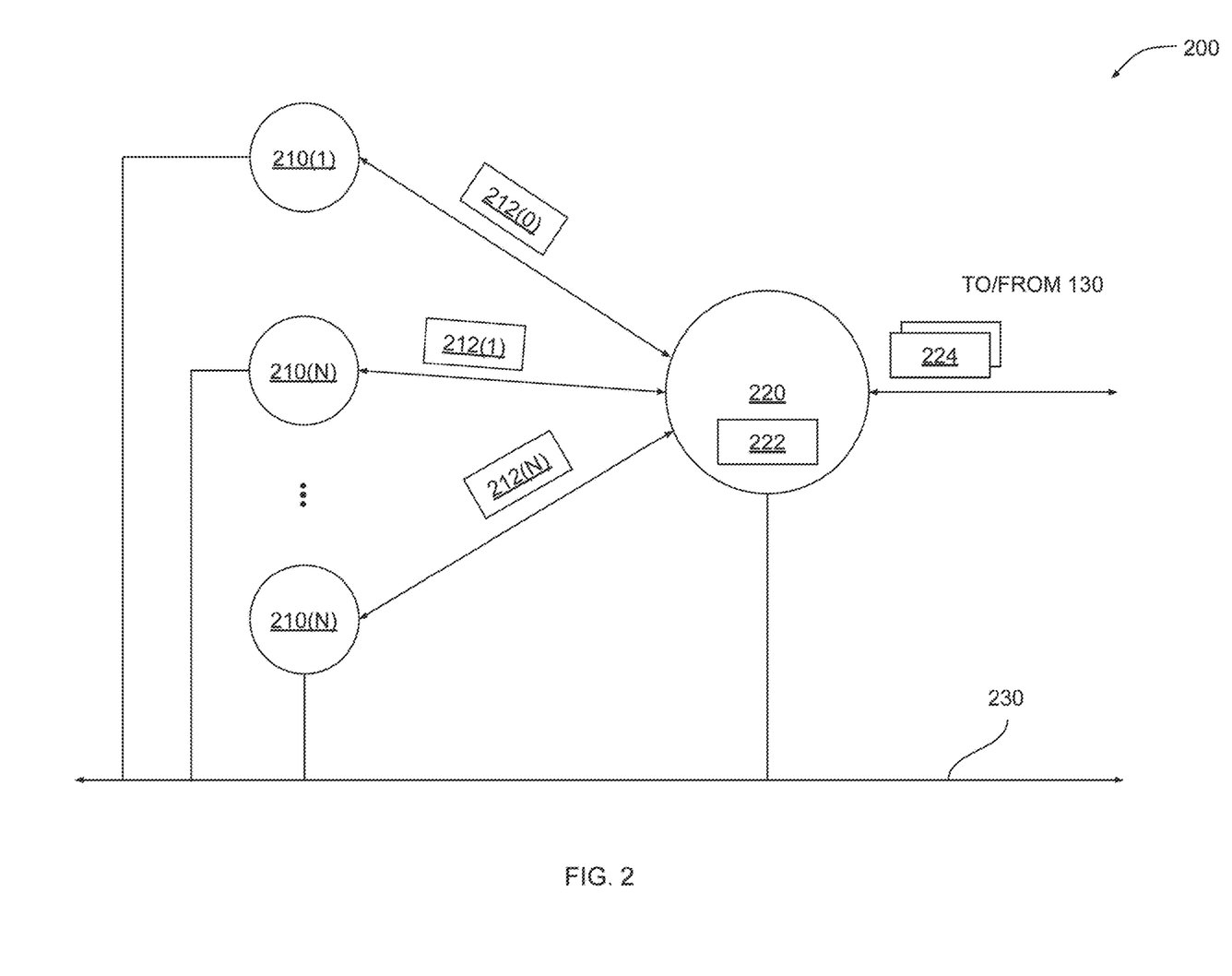
FIG. 2 illustrates an exemplary behind-the-meter configuration, according to various embodiments.

FIG. 2 illustrates an exemplary behind-the-meter (BTM) configuration, according to various embodiments. As shown, BTM configuration 200 includes DER devices 210(0) through 210(N), a node 220, and utility line 230. DER devices 210 are coupled to node 220. DER devices 210 and node 220 are coupled to a utility line 230. In one embodiment, DER devices 210 may be coupled indirectly to utility line 230 via node 220. In another embodiment, DER devices 210 may be connected directly to utility line 230.

Utility line 230 is configured to distribute resources to a given location where BTM configuration 200 is deployed. For example, utility line 230 could be a power line that distributes electricity to a residence. Node 220 is configured as a smart utility meter that monitors the distribution of resources via utility line 230 to generate metrology data 222. For example, node 220 could be a smart electric meter configured to generate metrology data that reflects the distribution of electricity via utility line 230. Node 220 may be any of the node types discussed above in conjunction with FIG. 1. Metrology data 222 quantifies the distribution and/or consumption of resources at the location where node 220 is deployed. Metrology data 222 may have any technically feasible resolution, although in practice metrology data 222 has sufficient resolution to identify relevant DER-oriented events (e.g., one-second resolution).

Each DER device 210 is configured to perform various operations to modify the distribution of resources via utility line 230. For example, DER device 210(0) could be a smart thermostat that limits the consumption of electricity via utility line 230 by modifying climate control settings. Alternatively, DER device 210(0) could be a solar power system configured to generate electricity and distribute at least a portion of that electricity onto utility line 230. DER device 210(0) could also be a home battery system configured to draw electricity from utility line 230 for storage.

A given DER device 210 can modify the distribution of resources based on the terms of a contract associated with an energy market. In so doing, the given DER device 210 may generate one or more commitments 212 that indicate the specific operation(s) the DER device 210 performs over one or more time intervals to fulfill the terms of the corresponding contract. As is shown, DER devices 210(0) through 210(N) generate commitments 212(0) through 212(N) and then transmit these commitments to node 220.

Node 220 is configured to perform a real-time validation of commitments 212 based on metrology data 222. Node 220 validates commitments 212 to confirm that DER devices 210 operate in accordance with any associated energy market contracts. As is shown, node 220 generates validated commitments 224 based on commitments 212(0) through 212(N) and metrology data 222. Node 220 performs various operations to validate a given commitment 224, as described in greater detail below in conjunction with FIGS. 3-6.

Node 220 transmits validated commitments 224 to control center 130 to facilitate various settlement processes associated with the energy market(s) in which DER devices 210 participate. Because node 220 has already confirmed that commitments 212 accurately reflect the various operations DER devices 210 perform to participate in the energy market(s), those settlement processes can be performed expeditiously and with minimal oversight. Accordingly, the real-time validation performed by node 220 can accelerate how quickly consumers are compensated for participation in energy markets. Node 220 is described in greater detail below in conjunction with FIG. 3.

Node Hardware Components

Figure 3:
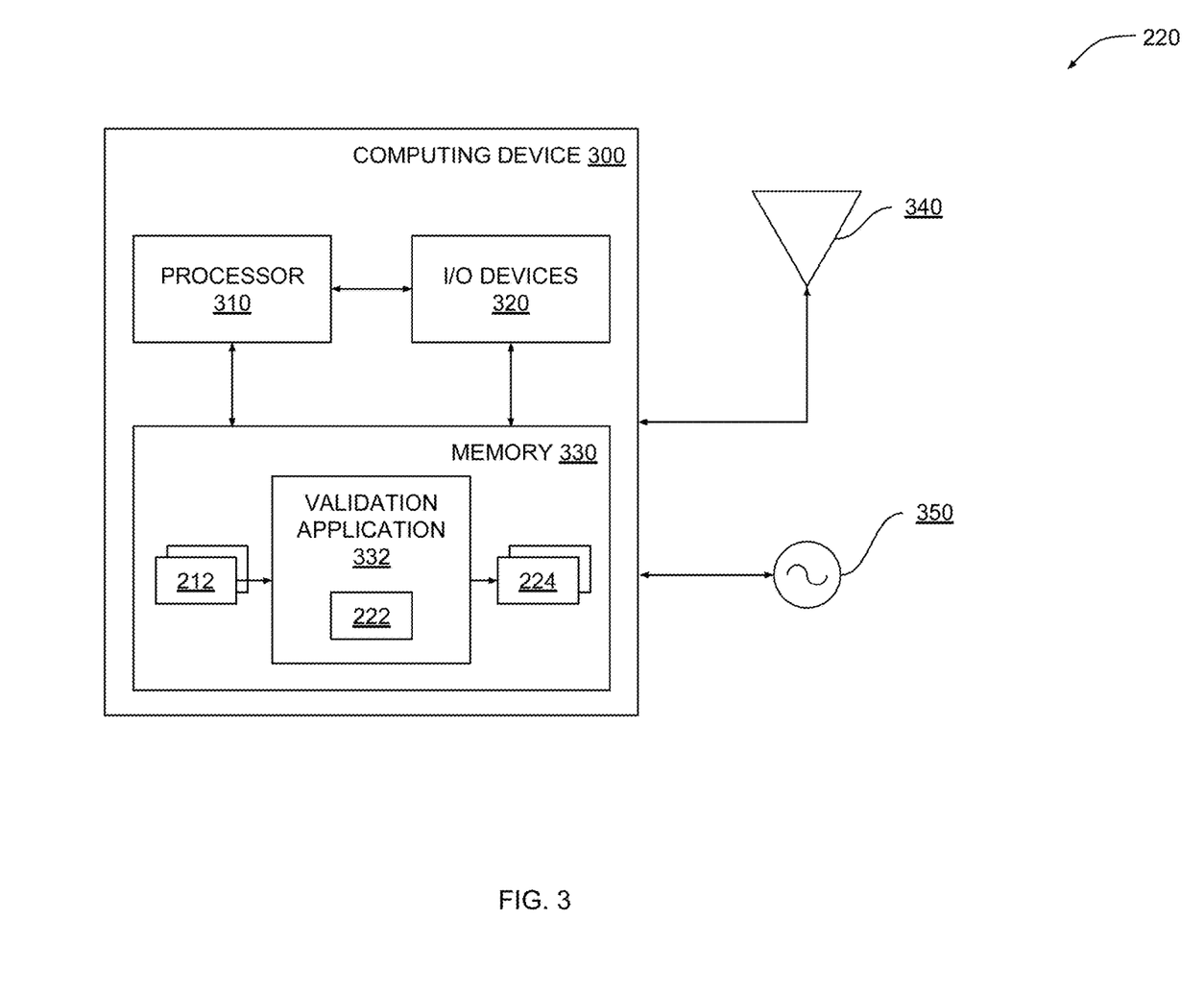
FIG. 3 is a more detailed illustration of the node of FIG. 2, according to various embodiments.

FIG. 3 is a more detailed illustration of the node of FIG. 2, according to various embodiments. As shown, node 220 includes a computing device 300 coupled to a transceiver 340 and an oscillator 350. Computing device 300 coordinates the operations of node 220. Transceiver 340 is configured to transmit and receive data packets across network system 100 using a range of channels and power levels. Oscillator 350 provides one or more oscillation signals according to which the transmission and reception of data packets can be scheduled. Node 220 may be used to implement any of border router nodes 112, MPD nodes 114, and BPD nodes 116 of FIG. 1.

Computing device 300 includes a processor 310, input/output (I/O) 320, and memory 330, coupled together. Processor 310 may include any hardware configured to process data and execute software applications. Processor 310 may include a real-time clock (RTC) (not shown) according to which processor 310 maintains an estimate of the current time. I/O devices 320 include devices configured to receive input, devices configured to provide output, and devices configured to both receive input and provide output. Memory 330 may be implemented by any technically feasible storage medium.

Memory 330 includes a validation application 332. Validation application 332 includes program code that, when executed by processor 310, analyzes one or more commitments 212 based on metrology data 222 to generate validated commitments 224. To validate a given commitment 212 associated with a given DER device 210, node 220 analyzes the commitment 212 to determine a specific operation the DER device 210 performs during a particular time interval. Node 220 then analyzes metrology data 222 to identify an "event" associated with that particular time interval. The event could be, for example, a change in resource distribution that exceeds a threshold during the time interval, among other possible events. Node 220 attempts to map the identified event back to the DER device 210 based on a library of events associated with different DER devices. In one embodiment, the library of events may include various signature patterns of activity that can be uniquely associated with specific DER devices. Node 220 also attempts to map the identified event to the specific operation set forth in the commitment 212. If node 220 successfully maps the identified event to the DER device 210 and to the specific operation set forth in commitment 212, then node 220 generates a validated commitment 224 confirming that the DER device 210 is responsible for performing the specific operation. Validation application 332 transmits the validated commitment 224 to control center 230 to facilitate a settlement process associated with an energy market in which the DER device 210 participates. Validation application 332 is described in greater detail below in conjunction with FIG. 4.

Node Software Modules

Figure 4:
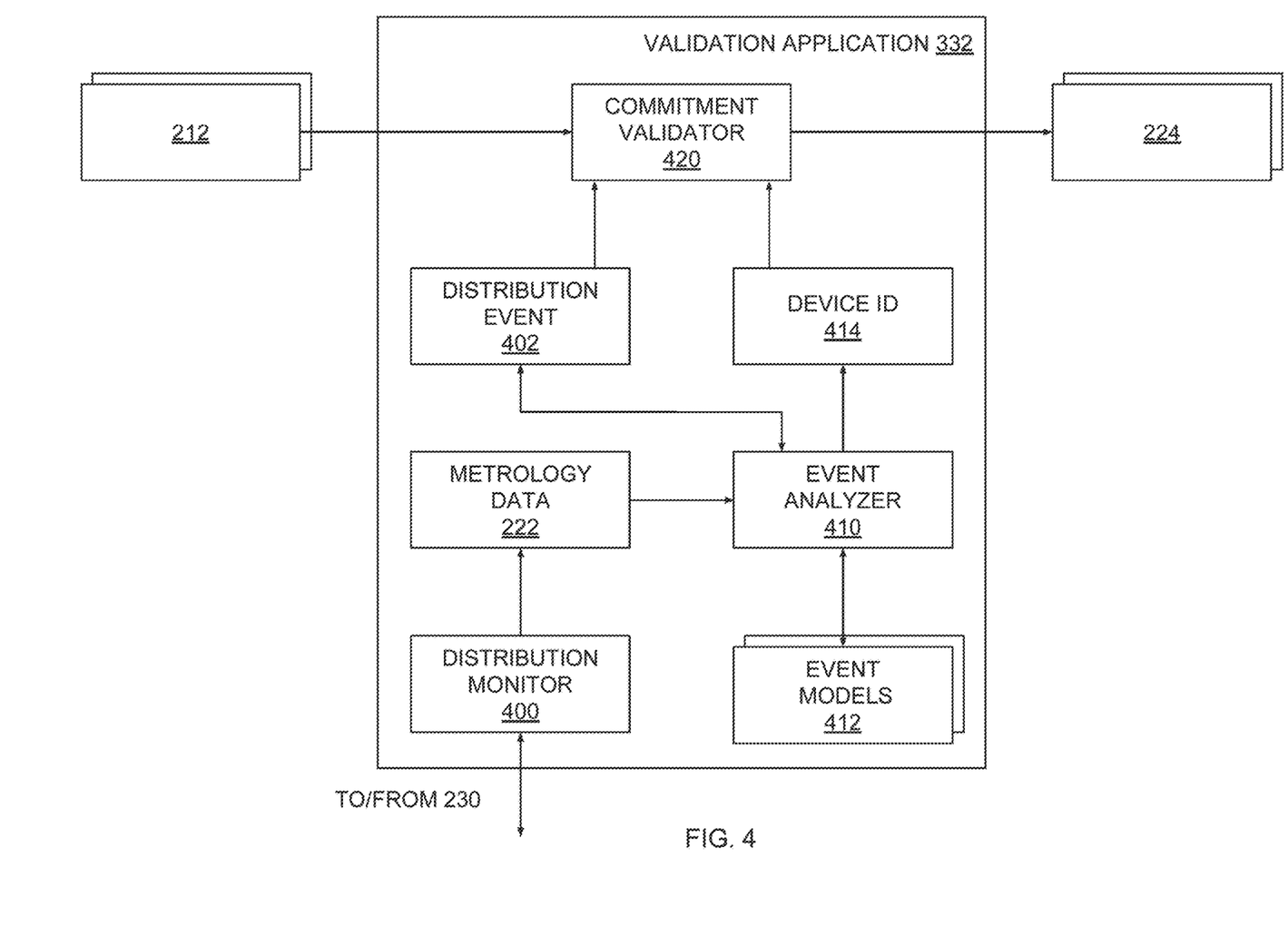
FIG. 4 is a more detailed illustration of the validation application of FIG. 3, according to various embodiments.

FIG. 4 is a more detailed illustration of the validation application of FIG. 3, according to various embodiments. As shown, validation application 332 includes a distribution monitor 400, an event analyzer 410, and a commitment validator 420. These various software modules interoperate to generate a validated commitment 224 based on metrology data 222 and a commitment 212, as described in greater detail herein.

Distribution monitor 400 is coupled to utility line 230 and configured to measure the real-time distribution of resources via utility line 230 to generate metrology data 222. Metrology data 222 includes one or more different channels of data collected over any technically feasible time period and with any resolution. As previously mentioned, in practice, metrology data 222 has one-second resolution.

Event analyzer 410 analyzes metrology data 222 to generate a distribution event 402. Distribution event 402 indicates some type of fluctuation in the distribution of resources. For example, distribution event 402 could indicate that the distribution of resources fell beneath a threshold level during a particular time interval. Event analyzer 410 can be configured to detect any technically feasible type of distribution event based on metrology data 222. Distribution events are discussed in greater detail below in conjunction with FIG. 5.

Event analyzer 410 queries event models 412 based on distribution event 402 to identify a particular event model 412 that corresponds to distribution event 402. A given event model 412 generally describes a time-varying pattern of resource distribution fluctuations that can be attributed to the operation of a DER device 210. In one embodiment, each event model 412 may indicate an electrical signature associated with a specific type of DER device 210 when performing a specific operation, such as powering on, powering off, or changing state. For example, one event model 412 could specify a decrease in electricity consumption that has specific characteristics indicative of a smart thermostat deactivating an air conditioning unit. Event models 412 can include Machine Learning models, parametric models, or any other technically feasible type of model that reflects time-varying behavior. Event models 412 are discussed in greater detail below in conjunction with FIG. 5.

Once event analyzer 410 successfully maps distribution event 402 to an event model 412, event analyzer 410 generates device identifier (ID) 414 to identify the particular type of DER device 210 responsible for causing distribution event 402. Event analyzer 410 then transmits distribution event 410 and device ID 414 to commitment validator 420. In one embodiment, once event analyzer 410 maps the distribution event 402 to the event model 412, event analyzer 410 may then update the event model 412 to reflect one or more characteristics of distribution event 402. In doing so, event analyzer 410 may implement Machine Learning to modify one or more parameters associated with the event model 402. This approach allows event models 412 to remain up-to-date with changing operational characteristics of DER devices 210.

Commitment validator 420 analyzes commitment 212 to determine the particular DER device 210 responsible for generating commitment 212. Commitment validator 420 also determines the specific operations the DER device 210 performs to satisfy the terms of an energy market contract during the time interval when those specific operations are to have occurred. Commitment validator 420 then processes distribution event 402 to confirm that those specific operations did, indeed, occur during the specified time interval.

For example, suppose commitment 212 indicates that DER device 210(0) begins storing power in a home battery system at a first point in time. Commitment validator 420 could confirm the occurrence of this particular operation upon determining that event 402 indicates a characteristic increase in electrical loading at the first point in time. Commitment validator 420 also processes device ID 414 to verify the identity of the DER device 210 responsible for generating commitment 212. In particular, commitment validator 420 determines that commitment 212 and device ID 414 are both associated with the same type of DER device 210 or the same instance of a DER device 210.

When commitment validator 420 successfully confirms that distribution event 402 and device ID 414 collectively indicate that the DER device 210 performs the operations set forth in commitment 212 during the specified time interval, commitment validator 420 then generates validated commitment 224. Via the above techniques, validated commitments 224 can be generated automatically and in real time. Validated commitments 224 can then be used to expedite a settlement process associated with an energy market.

Figure 5:
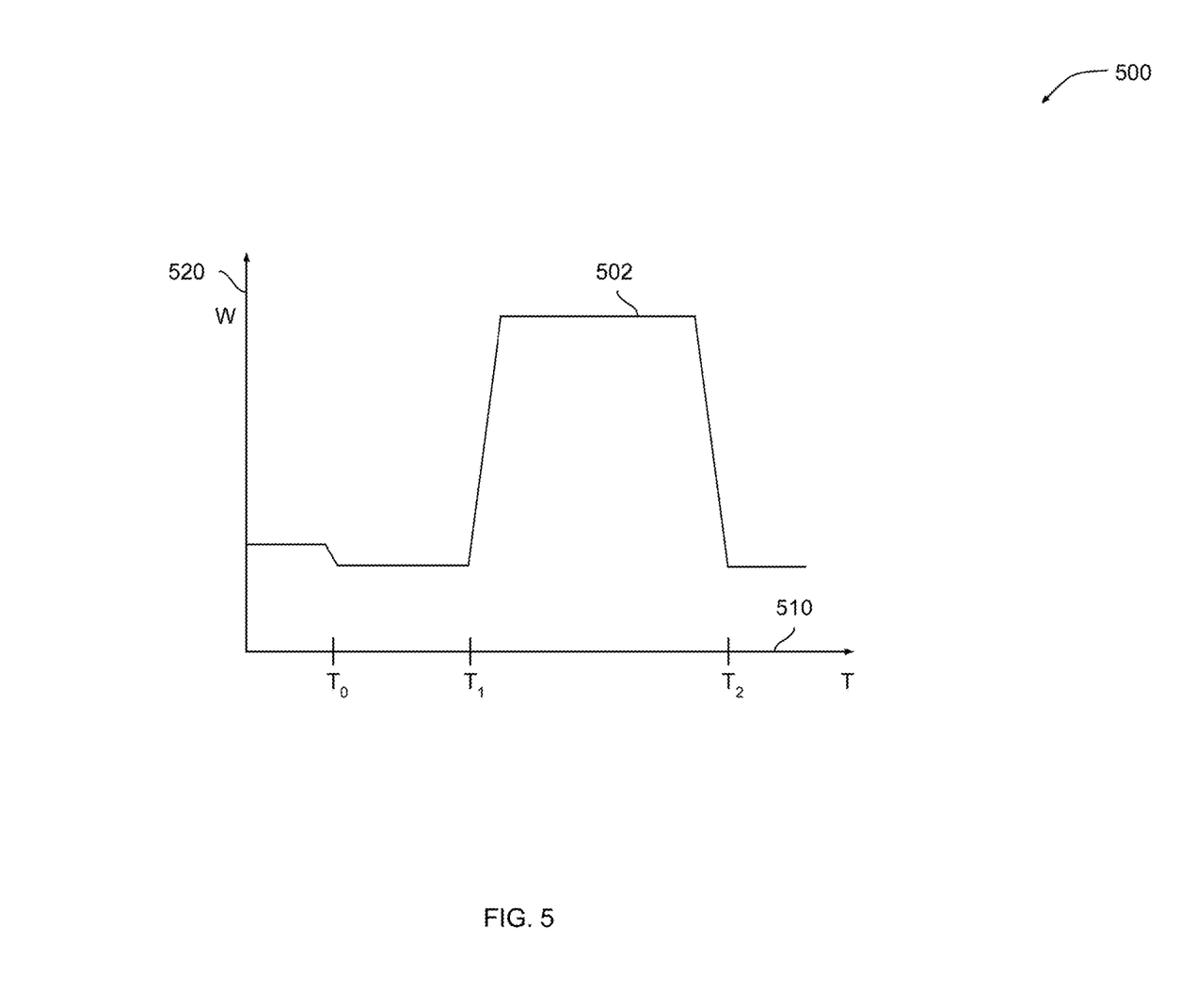
FIG. 5 is a graph of metrology data that is processed by the node of FIG. 2 when validating a commitment, according to various embodiments.

FIG. 5 is a graph of exemplary metrology data that is processed by the node of FIG. 2 when validating a commitment, according to various embodiments. As shown, a graph 500 includes metrology data 502 plotted against a time axis 510 and a wattage axis 520. Metrology data 502 indicates a time-varying wattage associated with a location where node 220 is deployed. That wattage decreases at time $T_0$, increases at $T_1$, and then decreases again at time $T_2$.

In the example described herein, validation application 332 within node 220 could analyze metrology data 502 and parameterize the various fluctuations shown in order to identify these fluctuations with specific DER devices 210. For example, validation application 332 could identify the slight decrease in wattage at time $T_0$ with DER device 210(0) powering off based on an event model 412 that characterizes the operation of DER device 210(0). In this manner, validation application 332 can determine signature patterns within metrology data 502 that uniquely identify specific DER devices 210 and/or specific operations performed by DER devices 210. The techniques described herein can also be implemented relative to any technically feasible metric other than wattage, including other electrical parameters and other parameters associated with resource distribution.

Referring generally to FIGS. 1-5, any of the techniques discussed herein can be performed by one or more separate elements of network system 1. In one embodiment, validation application 332 may be a distributed software application that executes partially on node 220 and partially in one or more other computing environments. For example, a first portion of validation application 332 could execute on node 220 to generate metrology data 222 and distribution events 402. A second portion of validation application 332 could execute remotely in a cloud-based environment to generate validated commitments 224 based on distribution events 402 and commitments 212. The second portion of validation application 332 could also execute locally on a device that resides proximate to node 220, such as a local server or a home smart device. In either case, when the first portion of validation application 332 detects an event, the second portion of validation application 332 may retroactively analyze metrology data 222 in greater detail to validate one or more commitments 212.

In another embodiment, node 220 may execute a distributed ledger client in order to share validated commitments 224 with other nodes that also execute the distributed ledger client. For example, node 220 could execute a blockchain client to participate in a blockchain network. In so doing, node 220 could transmit validated commitments 224 to other nodes in a hierarchy of nodes that participate in the blockchain network.

Persons skilled in the art will recognize that the techniques described herein can be implemented to validate any technically feasible type of operation that is performed by any technically feasible type of device coupled to any technically feasible type of resource distribution infrastructure. For example, the disclosed techniques could be implemented to validate modifications made to the distribution of water by a device that is coupled (directly or indirectly) to a water main.

Automatically Validating DER Device Commitments

Figure 6:
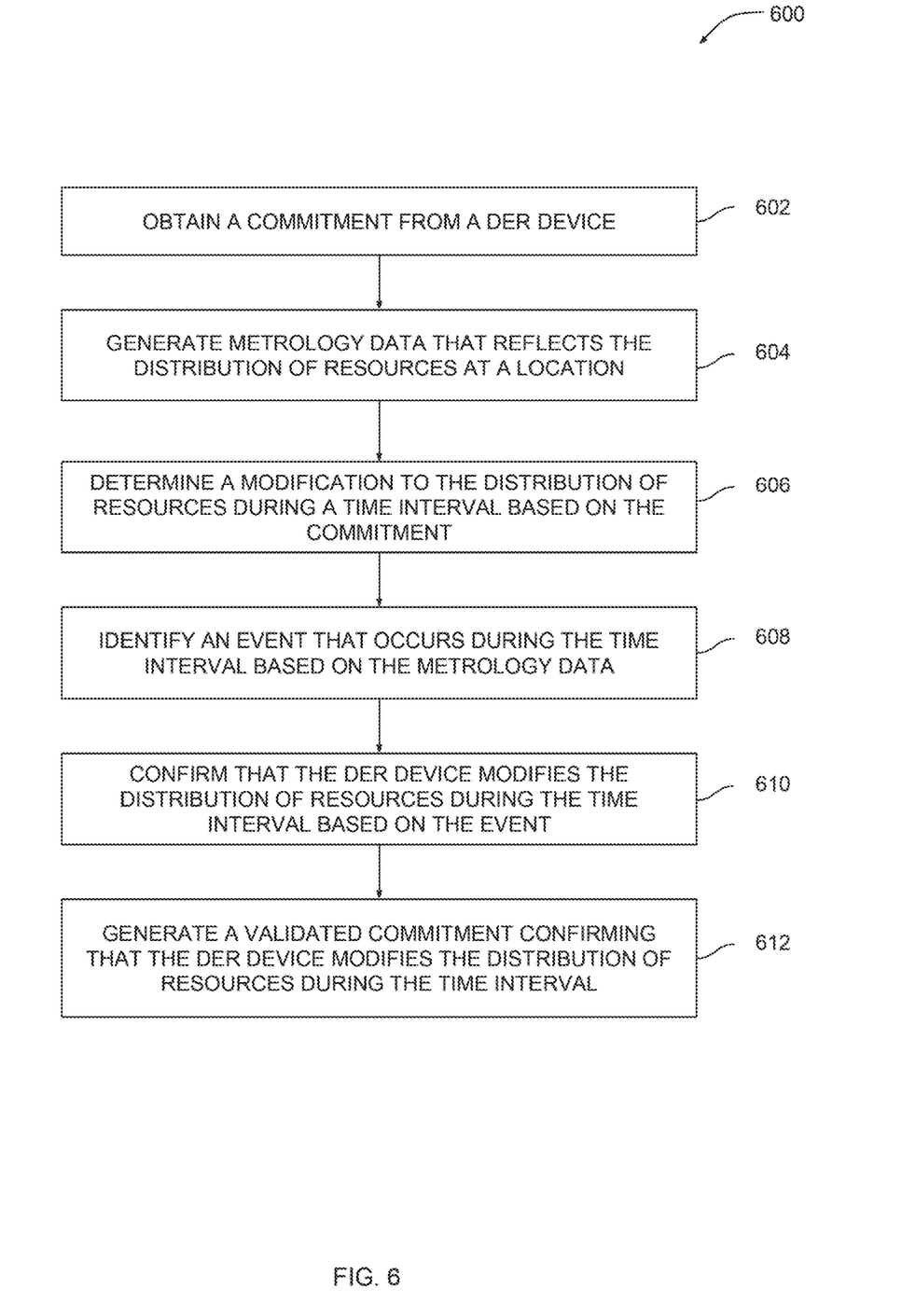
FIG. 6 is a flow diagram of method steps for validating DER device commitments, according to various embodiments.

FIG. 6 is a flow diagram of method steps for validating a DER device commitment in real time, according to various embodiments. Although the method steps are described in conjunction with the systems of FIGS. 1-5, persons skilled in the art will understand that any system configured to perform the method steps in any order falls within the scope of the present invention.

As shown, a method 600 begins at step 602, where node 220 of FIG. 1 obtains a commitment from a DER device. Node 220 is coupled to a utility line at a given location and configured to monitor the distribution of resources to the location via the utility line, in like fashion as shown in FIG. 2. The DER device is coupled to node 220 in a BTM configuration and can modify the distribution of resources at the location. For example, the DER device could be configured to draw resources from the utility line or distribute resources onto the utility line. The resources could be, for example, electricity, gas, water, or any other technically feasible type of resource.

At step 604, node 220 generates metrology data that reflects the distribution of resources via utility line 230. For example, the metrology data could indicate a kilowatt-hour measurement of electricity distributed to a residence. The metrology data may include one or more channels of real-time data having any technically feasible resolution, including one-second resolution (or less).

At step 606, node 220 determines a modification to the distribution of resources that occurs during a first time interval based on the commitment. The DER device generates the commitment upon performing various operations that modify the distribution of resources at the location. The DER device generally performs these operations in accordance with a contract associated with an energy market. For example, the DER device could be a solar power system that distributes at least a minimum amount of power onto the power grid.

At step 608, node 220 identifies a distribution event that occurs during the time interval based on the metrology data. As referred to herein, a distribution event refers to a measurable fluctuation in the distribution of resources at the location, such as, for example, a spike in resource consumption or production, among others. Node 220 can be configured to detect any technically feasible type of distribution event associated with any type of utility.

At step 610, node 220 confirms that the DER device modifies the distribution of resources during the time interval based on the event. In particular, node 220 maps the event to the DER device based on a library of event models that characterize different DER devices. In so doing, node 220 validates the authenticity of the DER device and can generate a device ID, such as device ID 414 of FIG. 4. Node 220 also maps the event to the modification of resource distribution indicated in the commitment, thereby confirming that the DER device did, in fact, modify the distribution of resources as reported in the commitment.

At step 612, node 220 generates a validated commitment confirming that the DER device modifies the distribution of resources during the time interval. Node 220 may then transmit the validated commitment to control center 130 in order expedite a settlement process associated with the energy market contract. The disclosed approach advantageously generates validated commitments automatically and with minimal oversight.

In sum, a distributed energy resource (DER) device is coupled to a utility meter in a "behind-the-meter" configuration. The utility meter analyzes a commitment generated by the DER device to determine a specific operation performed by the DER device at a particular time. The utility meter analyzes metrology data to identify an "event" associated with the particular time and then attempts to map the identified event back to the DER device based on a library of events associated with different DER devices. The utility meter also attempts to map the identified event to the specific operation set forth in the commitment. If the utility meter can successfully map the identified event to both the DER device and to the specific operation set forth in the commitment, then the utility meter generates a validated commitment. The validated commitment can be used to facilitate an energy market settlement process.

One technological advantage of the disclosed approach relative to the prior art is that commitments reported by DER devices are validated automatically by the utility meter, which enables the settlement process to be performed much faster relative to conventional approaches. Accordingly, consumers can be compensated for participating in energy markets much faster than the three-month or longer periods typically associated with conventional settlement processes. This technological advantage represents at least one technological advancement relative to prior art approaches.

1. Some embodiments include a computer-implemented method for validating distributed resource device commitments, the method comprising determining that a first commitment received from a first distributed resource device indicates that the first distributed resource device modified how much of a resource was consumed at a first location during a first time interval, generating first metrology data that indicates how much of the resource was consumed at the first location during the first time interval, and validating the first commitment based on the first metrology data.

2. The computer-implemented method of clause 1, wherein validating the first commitment comprises generating a first validated commitment confirming that the first commitment indicates that the first distributed resource device modified how much of the resource was consumed at the first location during the first time interval.

3. The computer-implemented method of any of clauses 1-2, further comprising generating a first distributed ledger transaction based on the first validated commitment, and transmitting the first distributed ledger transaction to one or more nodes included in a distributed ledger network.

4. The computer-implemented method of any of clauses 1-3, wherein validating the first commitment comprises identifying a first event that occurs at the first location based on the first metrology data, and determining that the first event indicates that the first distributed resource device modified how much of the resource was consumed at the first location during the first time interval.

5. The computer-implemented method of any of clauses 1-4, wherein determining that the first event indicates that the first distributed resource device modified how much of the resource was consumed at the first location during the first time interval comprises mapping the first event to a first event model included in a library of event models, wherein the first event model indicates at least one operational attribute of the first distributed resource device.

6. The computer-implemented method of any of clauses 1-5, further comprising modifying the first event model based on the first event, wherein the first event model comprises a Machine Learning model.

7. The computer-implemented method of any of clauses 1-6, wherein the first distributed resource device restricts resource consumption at the first location to modify how much of the resource was consumed at the first location.

8. The computer-implemented method of any of clauses 1-7, wherein the first distributed resource device offsets resource consumption at the first location via generation of additional resources to modify how much of the resource was consumed at the first location.

9. The computer-implemented method of any of clauses 1-8, wherein generating the first metrology data comprises measuring, in real time, one or more electrical characteristics corresponding to an electrical load associated with the first location.

10. The computer-implemented method of any of clauses 1-9, wherein identifying the first event comprises determining that at least one of the one or more electrical characteristics exceeds a threshold value.

11. Some embodiments include a non-transitory computer-readable medium storing program instructions that, when executed by a processor, causes the processor to validate distributed energy resource (DER) device commitments by performing the steps of determining that a first commitment received from a first distributed resource device indicates that the first distributed resource device modified how much of a resource was consumed at a first location during a first time interval, generating first metrology data that indicates how much of the resource was consumed at the first location during the first time interval, and validating the first commitment based on the first metrology data.

12. The non-transitory computer-readable medium of clause 11, wherein the step of validating the first commitment comprises generating a first validated commitment confirming that the first commitment indicates that the first distributed resource device modified how much of the resource was consumed at the first location during the first time interval.

13. The non-transitory computer-readable medium of any of clauses 11-12, wherein the step of validating the first commitment comprises identifying a first event that occurs at the first location based on the first metrology data, and determining that the first event indicates that the first distributed resource device modified how much of the resource was consumed at the first location during the first time interval.

14. The non-transitory computer-readable medium of any of clauses 11-13, wherein determining that the first event indicates that the first distributed resource device modified how much of the resource was consumed at the first location during the first time interval comprises mapping the first event to a first event model included in a library of event models, wherein the first event model indicates at least one operational attribute of the first distributed resource device.

15. The computer-implemented method of any of clauses 11-14, wherein the first distributed resource device restricts resource consumption at the first location or generates additional resources at the location to modify how much of the resource was consumed at the first location.

16. The computer-implemented method of any of clauses 11-15, wherein the first distributed resource device comprises a smart electric device, a smart water device, or a smart gas device.

17. Some embodiments include a system, comprising a memory that stores a software application, and a processor that, when executing the software application, is configured to perform the steps of determining that a first commitment received from a first distributed resource device indicates that the first distributed resource device modified how much of a resource was consumed at a first location during a first time interval, and validating the first commitment based on first metrology data that indicates how much of the resource was consumed at the first location during the first time interval.

18. The system of clause 17, wherein the processor resides within a smart utility meter that monitors resource consumption at the first location to generate the metrology data.

19. The system of any of clauses 17-18, wherein the processor is further configured to perform the additional step of obtaining the first metrology data from a node that is coupled to a resource distribution infrastructure and monitors resource consumption at the first location to generate the metrology data.

20. The system of any of clauses 17-19, wherein the processor validates the first commitment by identifying a first event that occurs at the first location based on the first metrology data, determining that the first event indicates that the first distributed resource device modified how much of the resource was consumed at the first location during the first time interval, and generating a validated commitment confirming that the first commitment indicates that the first distributed resource device modified how much of the resource was consumed at the first location during the first time interval.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
receiving, by a computing device, a commitment generated by a distributed resource device, wherein the commitment indicates a type of the distributed resource device and a time interval when the distributed resource device modified usage of a resource at a location, the distributed resource device being associated with a utility meter;
receiving, by the computing device, an event that is generated by the utility meter based on a pattern detected in metrology data indicating usage of the resource at the location during the time interval;
identifying, by the computing device, a first event model that is associated with a pattern of usage of the resource that matches the pattern detected in the metrology data indicating the usage of the resource at the location during the time interval, wherein the first event model is included in a library of event models that associate different patterns of usage of the resource with corresponding types of distributed resource devices;
validating, by the computing device, the commitment in response to determining that at least a type of distributed resource device associated with the first event model corresponds to the type of distributed resource device indicated by the commitment to generate a validated commitment; and in response to validating the commitment, performing, by the computing device, one or more computing operations to generate an output based on the validated commitment.

2. The method of claim 1, wherein validating the commitment further comprises determining that the distributed resource device modified the usage of the resource at the location during the time interval.

3. The method of claim 1, wherein the commitment indicates one or more actions performed by the distributed resource device during the time interval to modify the usage of the resource.

4. The method of claim 3, wherein validating the commitment further comprises determining, based on the pattern of usage of the resource at the location during the time interval, that the distributed resource device performed the one or more actions during the time interval.

5. The method of claim 3, wherein the one or more actions satisfy terms of a resource contract.

6. The method of claim 3, wherein the one or more actions comprise reducing consumption of the resource during the time interval.

7. The method of claim 1, wherein the one or more computing operations comprise transmitting the commitment to a control center to facilitate settlement of the commitment.

8. The method of claim 1, further comprising updating, by the computing device, the first event model based on the event.

9. The method of claim 1, wherein the first event model is a machine learning model or a parametric model.

10. A server, comprising:
one or more processors; and
a memory storing executable instructions that, when executed by the one or more processors, cause the one or more processors to perform operations comprising:
receiving a commitment generated by a resource management device, wherein the commitment indicates a time period when resource consumption at a location was altered by the resource management device, the resource management device being associated with a utility meter;
receiving an event that is generated by the utility meter based on a pattern detected in metrology data indicating resource consumption at the location during the time period;
mapping the pattern detected in the metrology data indicating the resource consumption to a first event model included in a library of event models, wherein respective event models in the library associate respective types of resource management devices with respective patterns of resource consumption;
validating the commitment by determining that at least a type of resource management device associated with the first event model matches a type of the resource management device that generated the commitment to generate a validated commitment; and
in response to validating the commitment, performing one or more computing operations to generate an output based on the validated commitment.

11. The server of claim 10, wherein the commitment identifies one or more actions performed by the resource management device during the time period to alter the resource consumption.

12. The server of claim 11, wherein validating the commitment further comprises mapping the event to the one or more actions performed by the resource management device.

13. The server of claim 12, wherein the one or more actions comprise reducing resource consumption during the time period or offsetting resource consumption by generating additional resources.

14. The server of claim 10, wherein the commitment is received from a utility meter.

15. The server of claim 10, wherein the operations further comprise updating the first event model based on the event.

16. A non-transitory computer-readable medium storing instructions that, when executed by one or more processor, cause the one or more processors to perform operations comprising:
- receiving, by a computing device, a commitment, wherein the commitment identifies a type of a distributed resource device that generated the commitment and a time interval when the distributed resource device managed consumption of a resource at a location, the distributed resource device being associated with a utility meter;
- receiving, by the computing device, an event that is generated by the utility meter based on a time-varying pattern detected in metrology data that indicates consumption of the resource at the location during the time interval;
- identifying, by the computing device, based on the time-varying pattern, a first event model having a matching time-varying pattern for the consumption of the resource, wherein the first event model is included in a library of event models that associate different patterns in the consumption of the resource with corresponding types of distributed resource devices;
- validating, by the computing device, the commitment in response to determining that at least a type of distributed resource device associated with the first event model corresponds to the type of distributed resource device identified by the commitment to generate a validated commitment; and
- in response to validating the commitment, performing, by the computing device, one or more computing operations to generate an output based on the validated commitment.

17. The non-transitory computer-readable medium of claim 16, wherein the commitment identifies one or more actions performed by the distributed resource device during the time interval to satisfy the commitment.

18. The non-transitory computer-readable medium of claim 17, wherein validating the commitment further comprises confirming, based on the time-varying pattern corresponding to the event, that the one or more actions were performed by the distributed resource device during the time interval.

19. The non-transitory computer-readable medium of claim 16, wherein the operations further comprise updating one or more parameters of the first event model based on the event.

20. The non-transitory computer-readable medium of claim 16, wherein the one or more computing operations further comprise:
- generating a first distributed ledger transaction based on the commitment; and
- transmitting the first distributed ledger transaction to one or more nodes included in a distributed ledger network.

* * * * *

UNITED STATES PATENT AND TRADEMARK OFFICE
CERTIFICATE OF CORRECTION

| | | |
|---|---|---|
| PATENT NO. | : 12,315,022 B2 | Page 1 of 1 |
| APPLICATION NO. | : 18/078866 | |
| DATED | : May 27, 2025 | |
| INVENTOR(S) | : Lucas Scheidler and Tim Patterson | |

It is certified that error appears in the above-identified patent and that said Letters Patent is hereby corrected as shown below:

In the Claims

Column 17, Claim 14, Line 10, please delete "a" and insert --the--;

Column 17, Claim 16, Line 14, please delete "processor" and insert --processors--.

Signed and Sealed this
First Day of July, 2025

Coke Morgan Stewart
*Acting Director of the United States Patent and Trademark Office*